Feb. 9, 1960 M. C. FERRE 2,924,289
METHODS AND APPARATUS FOR EXPLORING EARTH FORMATIONS
Filed Dec. 31, 1954 4 Sheets-Sheet 1

INVENTOR.
MAURICE C. FERRE.
BY Robert Hockfield
HIS ATTORNEY.

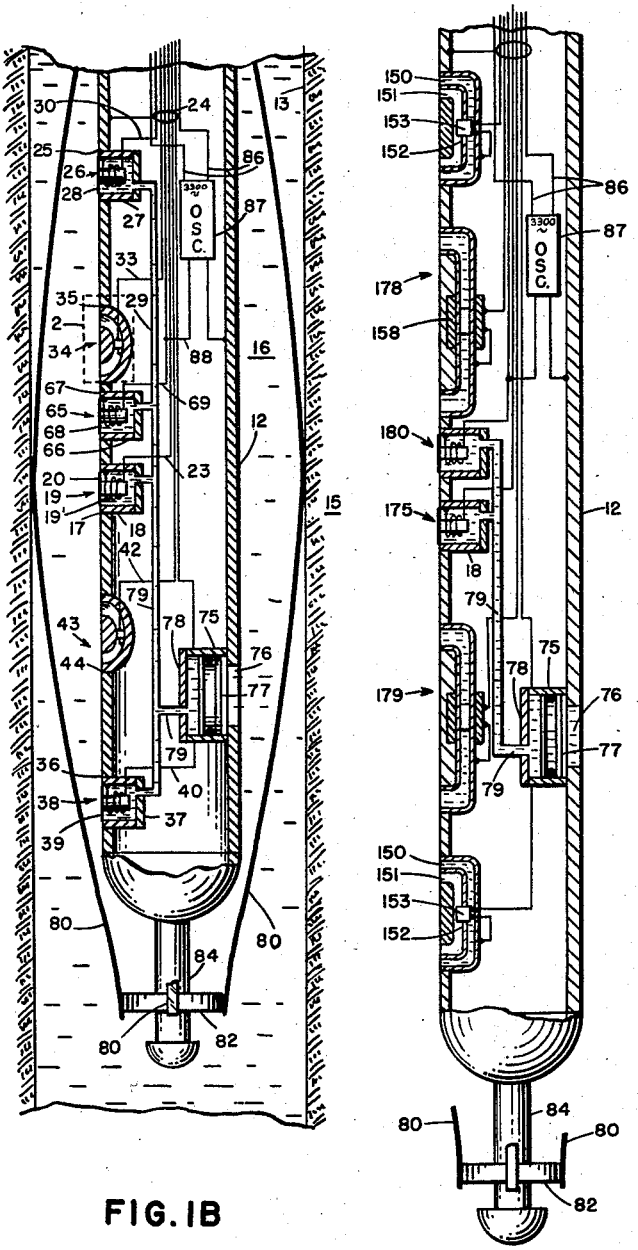

Feb. 9, 1960   M. C. FERRE   2,924,289
METHODS AND APPARATUS FOR EXPLORING EARTH FORMATIONS
Filed Dec. 31, 1954   4 Sheets-Sheet 3

INVENTOR.
MAURICE C. FERRE
BY Robert Hockfield
HIS ATTORNEY.

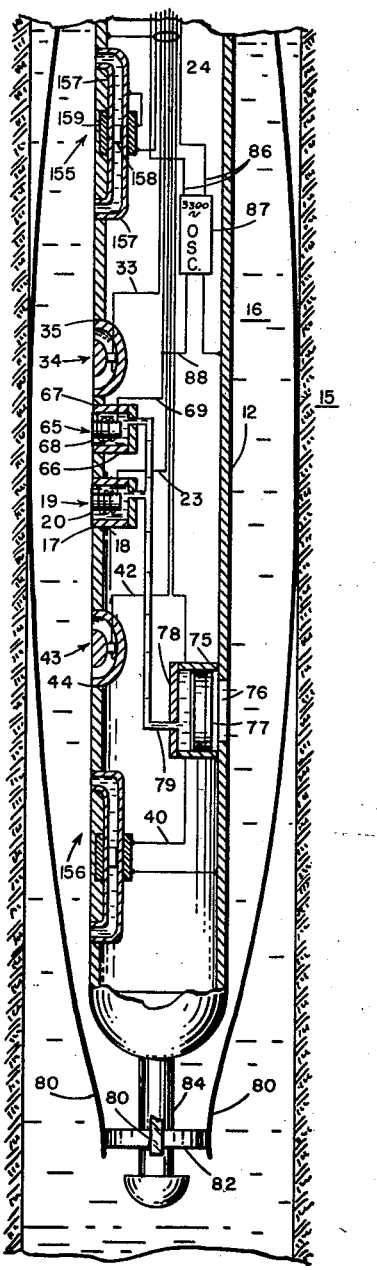

United States Patent Office 2,924,289
Patented Feb. 9, 1960

2,924,289

METHODS AND APPARATUS FOR EXPLORING EARTH FORMATIONS

Maurice C. Ferre, Ridgefield, Conn., assignor, by mesne assignments, to Schlumberger Well Surveying Corporation, Houston, Tex., a corporation of Texas Application December 31, 1954, Serial No. 479,043

16 Claims. (Cl. 181—.5)

This invention relates to methods and apparatus for exploring earth formations and, more particularly, pertains to new and improved methods and apparatus for investigating a physical characteristic of earth formations traversed by a bore hole containing a liquid in which a pressure field may be established.

Various systems have been proposed heretofore for investigating earth formations traversed by a bore hole in connection with the determination of the presence or absence of hydrocarbon-bearing formations. For example, the resistivity, the nuclear properties or other characteristics have been measured which, in general, provide information dependent upon fluid content of the formations. Thus, not only may the presence of fluids, such as hydrocarbons, be depicted, but an approximation of formation porosity is obtained.

For the most part, these prior systems have been entirely satisfactory; however, the porosity measurement is indirectly derived on the basis of fluid contained by the formations. Since porosity is an important factor in estimating the reservoir capacity of hydrocarbon-containing formations, information concerning physical characteristics of the formations themselves may be of considerable use.

It is, therefore, an object of the present invention to provide new and improved methods and apparatus for exploring the earth formations providing information concerning the formations themselves, rather than any fluids which may be contained therein.

Another object of the present invention is to provide new and improved methods and apparatus for investigating a physical characteristic of earth formations, such as the shear modulus of elasticity which depicts the porosity of the formations.

Another object of the present invention is to provide new and improved methods and apparatus for investigating earth formations by physically deforming the formations thereby to provide information concerning their physical characteristics.

A method for exploring earth formations in accordance with the present invention may be employed where the formations are traversed by a bore hole containing a liquid. In this method, a pressure field is induced in the liquid at one location in the bore hole and a pressure field is induced in the liquid at each of two locations in the bore hole spaced from the aforesaid one location in respective longitudinal directions along the bore hole so as to impede the propagation of liquid from the aforesaid one location toward each of the other locations. Indications are obtained of the instantaneous pressure in the liquid at another location in the bore hole near the aforesaid one location.

According to another aspect of the present invention, apparatus is provided for carrying out the foregoing method. This apparatus comprises an energy transducer adapted to be lowered into the bore hole and energy source means is coupled in energy-transfer relation to the transducer for establishing a pressure field in the liquid of the bore hole. Means are provided for reducing to a desired value longitudinal flow in the bore hole in the vicinity of the energy transducer. The apparatus further comprises means for providing indications of the fluid pressure at a location near the energy transducer.

The novel features of the present invention are set forth with particularity in the appended claims. The present invention, both as to its organization and manner of operation, together with further objects and advantages thereof, may best be understood by reference to the following description taken in connection with the accompanying drawings in which:

Figs. 1A and 1B are schematic representations of the upper and lower sections, respectively, of apparatus embodying the present invention, a portion thereof being shown broken away and in longitudinal cross section so as to reveal interior details;

Figs. 5, 6 and 7 illustrate, in longitudinal cross section, alternative arrangements which may be incorporated in the apparatus shown in Fig. 1B;

Fig. 8 is a schematic diagram of an alternative arrangement which may be used in a portion of the equipment shown in Fig. 1A; and Fig. 9 is an illustration in longitudinal cross-section of an alternative arrangement which may be incorporated in the apparatus shown in Fig. 7.

Figure 1A:
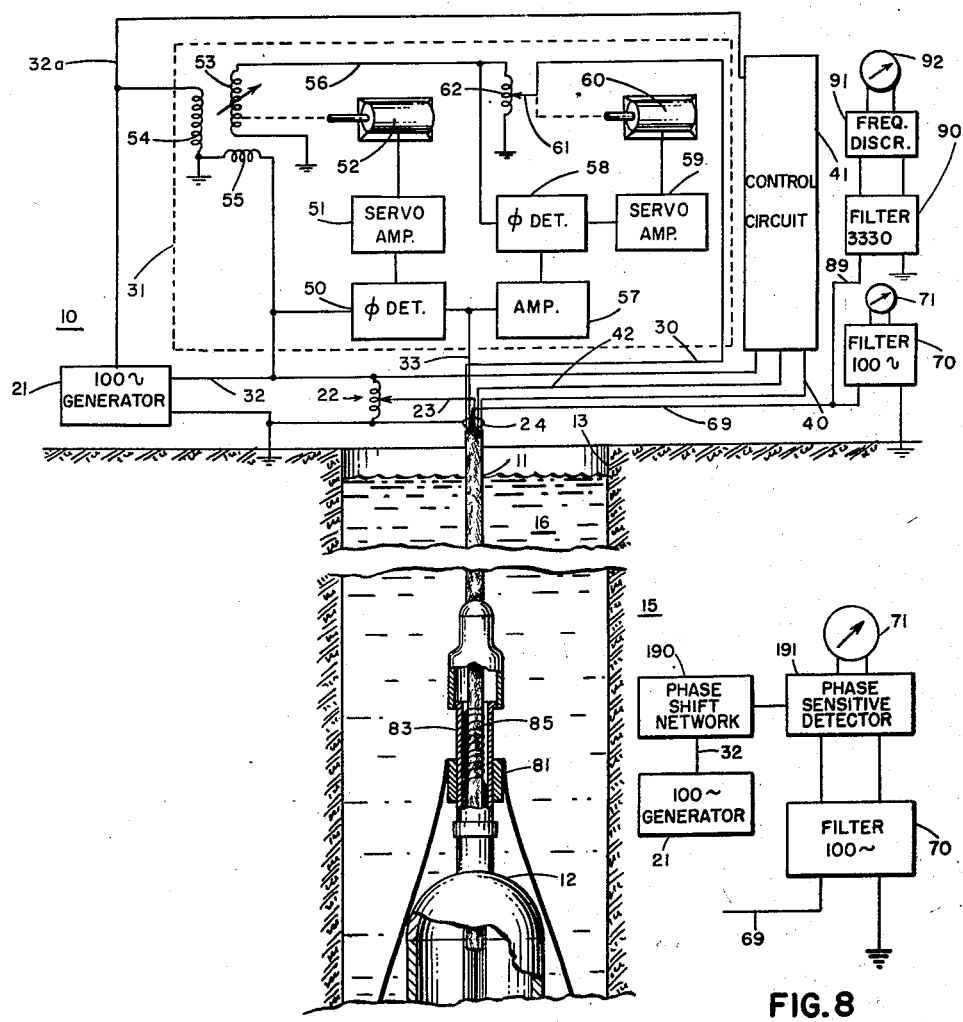

As shown in Fig. 1A of the drawings, apparatus constructed in accordance with the present invention is comprised of equipment 10 at the surface of the earth coupled by the insulated conductors of an armored cable 11 to components within a pressure-resistant housing 12 suspended by the cable in a bore hole 13. Bore hole 13 traverses earth formations 15 and contains a liquid 16, such as a drilling mud. Cable 11 may be employed, together with a winch (not shown) at the surface of the earth, for lowering and raising housing 12 in the bore hole 13 in a customary manner.

As shown in Fig. 1B, housing 12 is provided with a centrally located opening 17 which receives a container 18 for an electro-mechanical energy transducer 19 having its diaphragm 20 closing the opening 17. Transducer 19 may be any well-known type of electro-acoustical device for converting applied alternating current energy to acoustical energy; for example, the transducer may be constructed in a manner illustrated at page 249 of the text "Acoustics" by Stewart and Lindsay, published by D. Van Nostrand and Co., Inc. in 1930. Its actuating coil 19' is supplied with electrical energy generated by a source 21 at the surface of the earth (Fig. 1A) via an autotransformer 22, a lead 23 extending through cable 11 and appropriate ground connections to housing 12 and to a shield 24 of the cable. The operating frequency of generator 21 is adjusted so that the wave length of the resulting sonic energy generated by transducer 19 is long compared with the longitudinal length of housing 12. For example, an operating frequency of 100 cycles per second may be conveniently employed.

Another opening 25 in the vicinity of the upper end of housing 12 receives another energy transducer 26 having a container 27 and a diaphragm 28. It is connected by a lead 30 to a control circuit 31 enclosed by dash-line rectangle at the surface of the earth. Control circuit 31 will be described more fully hereinafter and, as will be seen, it receives via lead 32 current at a reference phase from source 21 and via lead 32a current at a phase 90° displaced from the reference phase, and supplies a signal having a desired characteristic to transducer 26 in accordance with a control potential supplied over a lead 33 by a velocity-sensitive electro-mechanical transducer 34. Transducer 34 is positioned within an opening 35 in housing 12 intermediate openings 17 and 25; the details of this transducer will be explained more fully in connection with a discussion of Fig. 2 to be presented hereinafter.

Housing 12 is provided with an opening 36 in the vicinity of its lower end which receives a container 37 for another electro-mechanical energy transducer 38 having a diaphragm 39. Transducer 38 also may be like transducer 19 in construction, and it is connected by a lead 40 to another control circuit 41 which may be identical to control circuit 31. Extension of leads 32 and 32a connect source 21 to control circuit 41 thereby supplying the two phases of the generated signal. In addition, control circuit 41 is coupled by a lead 42 to another velocity-sensitive energy transducer 43 mounted in an opening 44 intermediate openings 17 and 36 of housing 12. Transducer 43 may be identical in construction to transducer 34.

In Fig. 1A, control circuit 31 has been illustrated in single-line form; however, it is to be understood that wherever necessary, appropriate additional or ground connections may be employed to complete coupling circuits among the various elements. Control circuit 31 serves to adjust the phase and amplitude of the signal supplied to transducer 26 in response to the control potential at lead 33. To this end, lead 33 is connected to one input circuit of a conventional phase detector 50 having its remaining input circuit connected by an extension of lead 32 to one phase of the output circuit of generator 31. The output circuit of phase detector 50 is coupled to a servo amplifier 51 which may be of conventional construction and which governs the direction of rotation of a motor 52 in a well-known manner. Motor 52 is mechanically coupled to a movable coil 53 of a conventional phase-control device provided with fixed coils 54 and 55 mounted perpendicularly to one another and supplied via leads 32 and 32a with the two phases of the output of generator 21. Accordingly a signal of adjustable phase may be derived at a lead 56 extending from coil 53.

In order to effect amplitude control, the control signal at lead 33 is also supplied to an amplifier 57 coupled to one input circuit of another phase detector 58. The remaining input circuit of phase detector 58 is connected to lead 56 and its output circuit is coupled to a servo amplifier 59 which governs the direction of rotation of a motor 60. Motor 60 is mechanically coupled to a movable arm 61 of a conventional autotransformer 62 supplied with the signal at lead 56. Tap 61 is connected to lead 30 and thus the resulting signal is supplied to transducer 26.

As will be more apparent from the discussion to follow, the apparatus thus far described is operative to establish a pressure field in the liquid 16 of bore hole 13 at the general location of transducer 19. In addition, pressure fields are established in the liquid at each of two other locations in the vicinities of transducers 26 and 38 so as to impede the propagation of liquid from the location of transducer 19 toward each of the other locations. In order to obtain indications of the instantaneous pressure in the liquid at yet another location in the bore hole near the location of transducer 19, there is provided an electro-mechanical transducer 65 having its container 66 mounted within an opening 67 in housing 12 intermediate openings 17 and 35. This transducer may be similar to transducer 19; however, instead of converting electrical signals to acoustical energy, pressure at its diaphragm 68 is converted to an electrical signal that is supplied over a conductor 69 to a band-pass filter 70 at the surface of the earth. The purpose of this filter will be more apparent in the discussions to follow; for the moment it is enough to state that the filter passes signals at a frequency of 100 cycles per second to an indicator 71. Indicator 71, for example, may be a recording voltmeter in which the recording medium is displaced in proportion to movement of housing 12 through bore hole 13 thereby to provide a log of a physical characteristic of earth formation 15.

In operation, housing 12 is lowered into bore hole 13 and the signal from generator 21 is supplied with constant amplitude to transducer 19. Due to the resulting vibrational movement of diaphragm 20, the effective volume of transducer 19 varies by a fixed amount at a rate of 100 cycles per second. Accordingly, a pressure field is established in the liquid 16. At the same time, the signal from generator 21, supplied via control circuits 31 and 41 to transducers 26 and 38, similarly causes changes in volume at each of the latter transducers which establish pressure fields at their locations. Since transducers 34 and 43 are velocity-sensitive, each derives a control potential which represents fluid flow at their locations in the bore hole. These control potentials are supplied to the respective control circuits 31 and 41 which function in the following manner.

Any phase displacement in the signal supplied by transducer 34 over lead 33 to phase detector 50 relative to the signal at lead 32 is measured by the phase detector which operates in a known manner to provide a potential at its output circuit that controls motor 52 by means of servo amplifier 51. The motor, in turn, rotates coil 53 of phase control 53—55 and the phase of the resulting signal supplied to transducer 26 is varied accordingly. The phasing of the overall system is so selected that the signal supplied to transducer 26 has a phase such that the fluid velocity at transducer 34 is minimized.

At the same time, the signal from transducer 34 is compared in phase detector 58 with the properly phased signal at lead 56 to control, via servo amplifier 59, motor 60 and adjust the amplitude of the potential on tap 61 of autotransformer 62. Here again, the phasing is selected so that the amplitude of the signal supplied to transducer 26 is adjusted to minimize the fluid velocity at transducer 34. In this way, the phase as well as the amplitude of the signal supplied to the transducer 26 is automatically regulated so that fluid flow in a section of the bore hole at the level of transducer 34 is reduced to a reference value substantially equal to zero.

In the same manner, transducer 43 through the agency of control circuit 41 controls transducer 38 so as to reduce fluid flow in the vicinity of transducer 43 to a reference value substantially equal to zero. Accordingly, bore hole 13 is effectively "plugged" at the level of transducers 34 and 43. In other words, the operation is such that the bore hole effectively contains an immovable restriction at the levels of each of these transducers.

It may be easily shown that, under the foregoing conditions, the volume increase of a section of bore hole 13 with internal pressure, $p$, is:

$$\Delta V = \frac{1}{G} p V \qquad (1)$$

where $G$ is the shear modulus of elasticity of the earth formation 15 at the level under investigation, $V$ is the initial volume and $\Delta V$ is the change in volume.

Equation 1 above indicates that the shear modulus of elasticity of earth formations may be measured by obtaining indications of the pressure in the liquid in the vicinity of transducer 19. However, since the drilling mud is compressible, this fact must be taken into account and, using Equation 1, it can be easily shown that $$\frac{1}{G} = \left(\frac{\Delta V'}{K V \Delta p}\right) - \frac{1}{K} \qquad (2)$$

where K is a constant factor relating to the volume modulus of the drilling mud, $\Delta V'$ is the change in volume of the section of the bore hole that is effectively "plugged," and $\Delta p$ is the relative change in pressure in the liquid.

The factor K is constant; $\Delta V'$ may be maintained constant simply by supplying a constant amount of energy to transducer 19; and the volume V may be measured in a manner to be disclosed hereinafter. Thus it is apparent that the change in pressure at transducer 65 is dependent upon the shear modulus of elasticity of the formation material under investigation. Inasmuch as indicator 71 is coupled to the output of transducer 65, indications are obtained of the instantaneous pressure in the liquid at the location of this transducer which is near the location of transducer 19.

It is thus apparent that apparatus embodying the present invention may be employed to obtain a continuous log of a physical characteristic, such as the shear modulus of elasticity, of earth formations traversed by a bore hole. This information is directly related to porosity of the formations and, therefore, the present invention provides methods and apparatus for exploring the bore holes traversing earth formations utilizing direct rather than indirect techniques.

Since transducers 19, 26, 38 and 65 are of the diaphragm type, it may be desirable to include some means for accommodating the high pressures usually encountered deep in a bore hole. To this end, there is provided within housing 12 a cylinder 75 in fluid communication with an opening 76 in the side wall of housing 12. A movable piston 77 is positioned within cylinder 75 and an end closure 78 of the cylinder is connected by a tube 79 and various extensions thereof to the containers 18, 27, 37 and 66 of the respective transducers. A suitable liquid, such as an oil of medium viscosity, fills the system including the portion of piston cylinder 75 between end wall 78 and piston 77, pipe system 79 and the interior of the containers.

It is apparent that, in operation, as the external pressure on housing 12 acts on piston 77 driving it inwardly, the fluid pressure within the containers for the transducers is increased, thereby to counterbalance the pressure exerted by drilling fluid 16 on the diaphragms, 20, 28, 39 and 68. The size of piston cylinder 75 and its piston 77 are selected in a known manner to provide a suitable pressure relationship between the two sides of the various diaphragms thereby to prevent undue stresses and strains. Accordingly, undesirable deformation of the diaphragms may be avoided and the transducers may operate reliably and efficiently in their respective functions.

As pointed out hereinbefore, it may be desirable to obtain information concerning the volume of the section of bore hole 13 under measurement, and this may be done in any known manner. However, a gauge of the type illustrated in Figs. 1A and 1B, such as disclosed in Patent 2,639,512 of J. C. Legrand may be conveniently employed.

The gauge comprises a plurality of angularly spaced, arched or bowed springs 80 secured at their upper and lower extremities to junctions which may be in the form of collars 81 and 82 slidably mounted on cylindrical members 83 and 84 which extend from the upper and lower extremities of housing 12. A suitable stop may be provided to limit movement of collar 82 so that as the assembly of springs 80 is drawn through bore hole 13 and is varied in a direction transverse to the axis of the bore hole, the collar 81 moves longitudinally according to variations in the size of the bore hole.

Member 83 is of tubular construction and it encloses a self-inductance winding or coil 85 connected by a pair of conductors 86 to the frequency-determining circuit (not shown) of a signal generator or oscillator 87. Accordingly, the frequency of the signal generated by the oscillator 87 is representative of the diameter of bore hole 13.

The operating frequency for oscillator 87 is selected so that one of the conductors of cable 18, employed for the measuring function described hereinbefore, may serve the additional purpose of bore hole gauging. Accordingly, a frequency, for example, of 3330 cycles per second may be selected and the oscillator is connected by a lead 88 to the lead 69 which extends through cable 11. At the surface of the earth a connection 89 from lead 69 extends to a band-pass filter 90 arranged to pass with substantially no attenuation signal frequencies at 3330 cycles per second to a frequency discriminator 91 of conventional construction, in turn, coupled to a recording voltmeter 92.

Collar 81 may be constructed of a conductive or a magnetic material so that, in operation, the inductance of coil 85 is dependent upon the position of the collar. Hence, the frequency of oscillator 87 is dependent upon the position of the collar. As the entire assembly including housing 12 and the bowed springs 80 is drawn through the bore hole and the collar is displaced in response to variations in the diameter of bore hole 13, the frequency of the oscillator varies accordingly and the output of frequency discriminator 91 is representative of the diameter of the bore hole. In this way, a continuous record may be made of the diameter of the bore hole on indicator 92 as a function of depth in the bore hole. Since the distance between velocity-sensitive transducers 34 and 43 is fixed, the indicator 92 may be suitably calibrated to provide readings directly indicative of the volume expressed in the above Equations 1 and 2.

It is evident that since filter 70 excludes all frequencies but the 100 cycle per second signal supplied by transducer 19, the 3330 cycle per second signal of oscillator 87 produces no effect on indicator 71. Similarly, since filter 90 excludes all frequencies but that supplied by oscillator 87, the 100 cycles per second signal developed by transducer 19 causes no effect at indicator 92.

Of course, if desired, a suitable computer may be employed so that the output of discriminator 91 may be appropriately combined with the output at filter 70 thereby to provide a continuous log of the shear modulus of elasticity of the formations as the housing 12 traverses bore hole 13.

Figure 2:
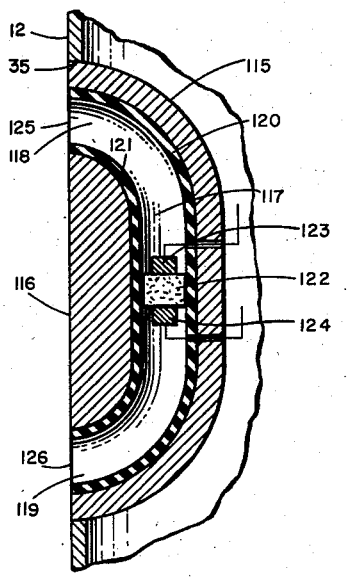
Fig. 2 is an enlarged representation of a portion of Fig. 1B enclosed by dash line 2, illustrating the details of a velocity-sensitive transducer.

One type of velocity-sensitive transducer which may be employed in the apparatus of Fig. 1B is shown in greater detail in Fig. 2. It comprises a cup shaped housing or container 115 having its open end sealed to opening 35 of housing 12. A blocking member 116 is supported in the open end of container 115 and is suitably formed so as to provide a derivative channel 117 effectively in fluid coupling relation with the drilling mud via channels 118 and 119. Adjacent confronting surfaces of container 115 and blocking member 116 are covered by respective layers 120 and 121 of electrically insulating material.

Supported centrally within and closing derivative channel 117 is a porous membrane 122 having affixed to opposite sides thereof electrodes 123, 124 to which suitable electrical connections may be made. Preferably, channels 118 and 119 are closed by soft flexible membranes 125 and 126 and the channels 117—119 are filled with a suitable liquid electrolyte.

Any pressure in the liquid of the bore hole is transmitted equally to the derivative channel 117 and no resulting potential is derived by the transducer. However, any fluid flow produces a pressure difference between the two sides of porous member 122 and the resulting streaming potentials which are developed in a well-known manner are detected by electrodes 123 and 124. Accordingly, a potential is derived representative only of fluid flow in the vicinity of the transducer.

Figure 3:
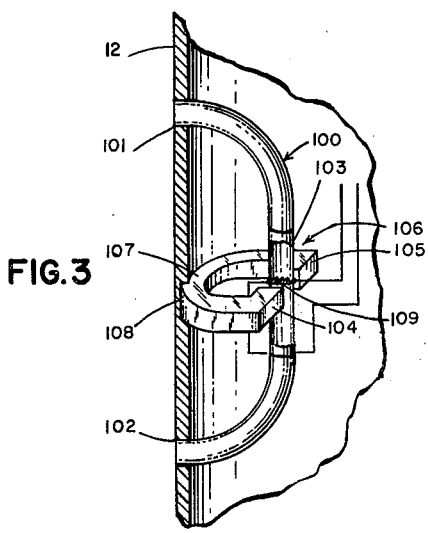
Fig. 3 is a perspective representation, partly in section, of another form of velocity-sensitive transducer.

Another form of velocity-sensitive transducer is shown in Fig. 3. It comprises a tube 100 of curved, or C- shaped configuration having its ends sealed to spaced openings 101 and 102 disposed in vertical alignment relative to one another in housing 12. The tube is provided with a central section 103 preferably constructed of a non-magnetic, electrically insulating material positioned between the end poles 104 and 105 of a horseshoe type magnet 106. The magnet 106 has its bight section 107 secured within a recess 108 in the inner surface of the housing.

Tube section 103 functions as a derivative channel and a conductive ribbon-type diaphragm 109 is secured to opposite portions of the wall of this channel section. The terminals for the ribbon extend through the tube wall and electrical connections may be made to these terminals.

In operation, if there is any vertical velocity in the liquid of bore hole 13, there is necessarily a velocity of the fluid within the derivation channel 103. Ribbon 109 is thereby displaced at the operating frequency of 100 cycles per second, and as it vibrates, an electromotive force is generated. Obviously, any increase in pressure in the fluid of bore hole 13 produces similar changes in opposite ends of tube 100 and there can be no resulting displacement of diaphragm 109. Consequently, pressure alone cannot actuate the velocity-sensitive microphone illustrated in Fig. 3.

Of course, the open ends of tube 100 may be closed by flexible membranes and a suitable liquid introduced within it. The liquid should be inert; for example, mineral oil may be employed for this purpose.

Figure 4:
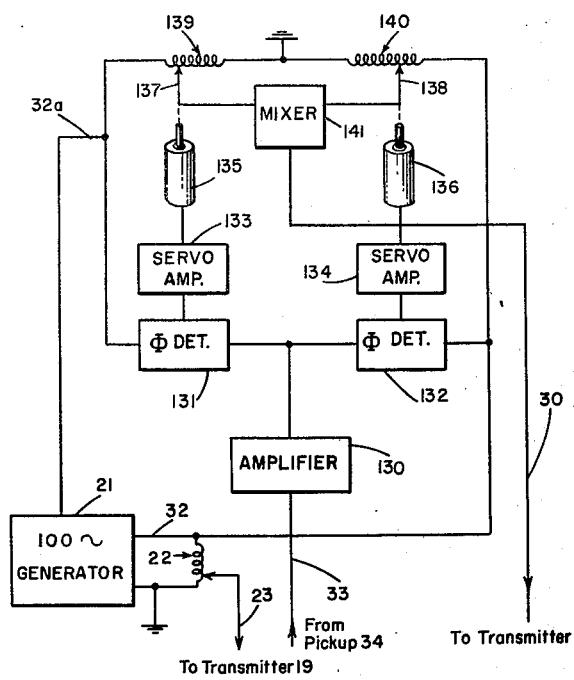
Fig. 4 is a schematic diagram of an alternative arrangement which may be used in a portion of the equipment shown in Fig. 1A.

Another form of control circuit which may be employed in the apparatus of Figs. 1A and 1B is illustrated in Fig. 4 wherein like elements are presented by the same reference numerals. The output of velocity-sensitive transducer 34 is supplied via lead 33 to an amplifier 130, in turn, coupled to input circuits of a pair of phase detectors 131 and 132. The two phases of the signal developed by generator 21 are supplied over leads 32 and 32a to the remaining input circuits of phase detectors 131 and 132, respectively. The output circuits of the phase detectors are coupled to respective servo amplifiers 133 and 134 which control driving motors 135 and 136.

The driving motors 135 and 136 control the positions of movable taps 137 and 138 of a pair of autotransformers 139 and 140. Autotransformer 139 is supplied with the phase of the output signal of generator 21 available at lead 32a while autotransformer 140 is supplied with the phase of the signal at lead 32. The voltages derived at taps 137 and 138 are supplied to a mixer 141 where they are vectorially combined and supplied via lead 30 to transducer 26.

In operation, the velocity-representing signal at lead 33 is compared with the reference signal at lead 32a in phase detector 131 and by means of servo amplifier 133, motor 135 is rotated in such a manner to adjust tap 137 in such a direction whereby the signal at lead 33 is minimized. At the same time, the signal at lead 33 is compared in phase detector 132 with the reference signal at lead 32 and servo amplifier 134 controls motor 136 so that tap 138 is displaced in a manner reducing the signal at lead 33. In other words, the phase components of the signal at lead 33 corresponding to the two phases produced by generator 21 are compared and adjusted so that the resulting signal developed at mixer 141 and supplied via lead 30 is of proper amplitude and phase providing the above-described "plugging" action in the bore hole.

Although separate control circuits 31 and 41 have been illustrated in the apparatus of Figs. 1A and 1B for individually controlling the transducers 26 and 38, in some applications it may be possible to combine the outputs of velocity-sensitive transducers 34—43 so that a single control circuit may be amplified for controlling both of the transducers 26 and 38.

Figure 5:
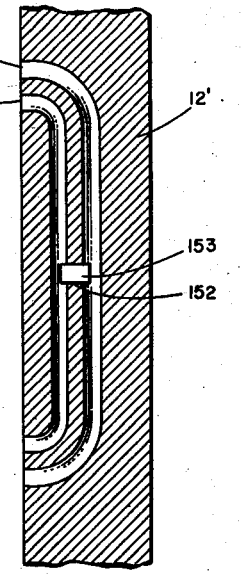

This type of control may also be accomplished through the use of the alternative arrangement illustrated in Fig. 5. Housing 12 is provided with a modified section 12' having a pair of channels 150 and 151 extending in parallel relation to one another through the side wall thereof. One pair of adjacent ends of channels 150 and 151 is exposed to the fluid pressure in the bore hole in the approximate position occupied by transducer 34 (Fig. 1B) and the remaining ends of the channels 150 and 151 are exposed to the bore hole liquid in the approximate position of transducer 43 (Fig. 1B). A centrally located opening 152 in the wall portion 12' provides fluid communication between the channels 150 and 151 and a differential pressure detector 153 is disposed in opening 152.

In this way, the velocities, or pressure differentials at the open ends of the channels 150 and 151 are added directly at the detector 153. In other words, the differential pressures are averaged and then a single pressure difference is detected and supplied to a control circuit which governs the signal supplied to transducers 26 and 38 of Fig. 1B.

In the alternative arrangement illustrated in Fig. 6, elements which find their counterpart in Fig. 1B are represented by the same reference numerals. Instead of the type of energy transducer described hereinbefore in connection with devices 26 and 38, a pair of differential generators 155 and 156 are employed. These may be of identical construction and, for example, generator 155 comprises a vertical tube 157 open at its top and bottom ends and enclosing a piston 158 of magnetic material. Tube 157 is concentrically enclosed by an energizing coil 159 which may be suitably energized from control circuit 31 (Fig. 1A) so as to drive piston 158. The open ends of tube 157 are exposed to fluid 16 and thus as the piston 158 is driven, fluid is discharged at one end of the tube 157 while it is drawn into the other end. Accordingly, a pressure is created at one end of the tube and the energizing signals supplied to the differential generators 155 and 156 are suitably phased so that pressures of opposite sign are created at the opposite ends of these generators. An advantage of the type of transducer illustrated in Fig. 6 is that since both ends of the tube are exposed to the drilling liquid, no provision is necessary to compensate for pressure in the bore hole.

In the embodiment illustrated in Fig. 7 a pressure detector 175 is located centrally relative to housing 12 and additional pressure detectors 176 and 177 are positioned at the upper and lower ends of the housing. Disposed intermediate detectors 175 and 176 is a differential generator 178, and another differential generator 179 is similarly positioned between detectors 175 and 177. A volume-change generator 180 is located between pressure detector 175 and differential generator 178. A signal of constant amplitude supplied to transducer 180 and a control circuit similar to the one designated by numeral 31 in Fig. 1A may be employed to control differential generators 178 and 179 so as to establish resulting pressures at pressure detectors 176 and 177 substantially equal to zero. By measuring the output of detector 175 a log of the shear modulus of earth formations traversed by the bore hole 13 similar to that obtained with the apparatus of Figs. 1A and 1B may be obtained.

Of course, an inverse arrangement of that represented in Fig. 7 may be obtained by interchanging the detectors 176 and 177 with differential pressure detectors as is shown in Fig. 9.

In the various embodiments of the invention which have been described hereinbefore, indications may be obtained of fissures in the earth formations by using an appropriate phase detector in the manner illustrated in Fig. 8. For example, a phase sensitive detector 191 using a reference from generator 21 in Figs. 1A and 1B may be introduced between filter 70 and indicator 71. By appropriately adjusting the phase detector through the use of a suitable phase delay network 190, the apparatus may be made more responsive to the shear modulus of the formations. Alternatively, the phase adjustment may be such that the presence of a fissure produces a greater indication than does a change in shear modulus.

In various embodiments, instead of velocity detectors, differential pressure detectors may be employed. For example, in Fig. 3, flexible diaphragm 109 may be replaced by a stiff diaphragm. Although the phase relationship of the detected signal is different, the operation is generally the same as described hereinbefore.

While particular embodiments of the present invention have been shown and described, it is apparent that changes and modifications may be made without departing from this invention in its broader aspects, and therefore the aim in the appended claims is to cover all such changes and modifications as fall within the true spirit and scope of this invention.

I claim:

1. A method for exploring earth formations traversed by a bore hole containing a liquid which comprises the steps of: inducing a pressure field in the liquid at one location in the bore hole; simultaneously inducing a pressure field in the liquid at each of two other locations in the bore hole spaced from said one location in respective longitudinal directions along the bore hole so as to impede the propagation of liquid from said one location toward each of said other locations; and simultaneously obtaining indications of the instantaneous pressure in the liquid at another location in the bore hole near said one location.

2. A method for investigating a physical characteristic of earth formations traversed by a bore hole containing a liquid which comprises the steps of: establishing a volume change in the liquid at one location in the bore hole; altering the pressure field associated with said volume change at each of two other locations in the bore hole spaced from said one location in respective longitudinal directions along the bore hole so as to reduce to substantially zero the fluid flow along the bore hole in the directions of said other locations; and obtaining indications of the instantaneous pressure in the liquid at another location in the bore hole within said field near said one location.

3. A method for investigating a physical characteristic of earth formations traversed by a bore hole containing a liquid which comprises the steps of: establishing an alternating pressure field in the liquid at one location in the bore hole; bringing substantially to zero the longitudinal flow of liquid associated with said pressure field at each of two other locations in the bore hole spaced from said one location in respective longitudinal directions along the bore hole; and obtaining indications of the instantaneous pressure in the liquid at another location in the bore hole within said pressure field near said one location.

4. A method for investigating a physical characteristic of earth formations traversed by a bore hole containing a liquid which comprises the steps of: establishing a pressure field in the liquid at a first location in the bore hole; detecting fluid flow at each of second and third locations in the bore hole spaced from said first location in respective longitudinal directions along the bore hole; reducing said fluid flow substantially to zero by establishing a pressure field in the liquid at each of fourth and fifth locations in the bore hole spaced from said first location in respective longitudinal directions along the bore hole responsive to the aforesaid fluid flow at said second and said third locations; and obtaining indications of the instantaneous pressure in the liquid at another location in the bore hole near said first location.

5. A method for investigating a physical characteristic of earth formations traversed by a bore hole containing a liquid which comprises the steps of: establishing a pressure field in the liquid at a first location in the bore hole; detecting fluid flow at each of second and third locations in the bore hole spaced from said first location in respective longitudinal directions along the bore hole to derive a control effect representing said fluid flow; utilizing said control effect to adjust the intensity of a pressure field established in the liquid at each of fourth and fifth locations in the bore hole spaced from said first location in respective longitudinal directions along the bore hole so as to reduce said fluid flow substantially to zero; and obtaining indications of the instantaneous pressure in the liquid at another location in the bore hole near said first location.

6. A method for investigating a physical characteristic of earth formations traversed by a bore hole containing a liquid which comprises the steps of: establishing a pressure field in the liquid at a first location in the bore hole; detecting fluid flow at each of second and third locations in the bore hole spaced from said first location in respective longitudinal direction along the bore hole to derive two control effects, each representing fluid flow at one of said second and said third locations; utilizing each of said control effects to adjust the intensity of one of two pressure fields established in the liquid at each of two other locations in the bore hole spaced from said one location in respective longitudinal directions along the bore hole so as to reduce said fluid flow at said second and said third locations substantially to zero.

7. Apparatus for exploring earth formations traversed by a bore hole containing a liquid comprising: an energy transducer adapted to be lowered into the bore hole; another energy transducer mounted in fixed relation to said first-mentioned transducer in longitudinally spaced relation thereto; energy source means coupled in energy-transfer relation to said first-mentioned transducer for establishing a pressure field in the liquid of the bore hole and to said other transducer for establishing an additional pressure field in the liquid of the borehole for reducing to a desired value longitudinal fluid flow in the bore hole at a zone intermediate said energy transducers; and means for providing indications of the fluid pressure at a location intermediate said zone and one of said energy transducers.

8. Apparatus for exploring earth formations traversed by a bore hole containing a liquid comprising: a first energy transducer adapted to be lowered into the bore hole; first energy source means coupled in energy-transfer relation to said first transducer for establishing a pressure field in the liquid of the bore hole; a pair of longitudinally spaced apart energy transducers mounted in fixed relation to and on opposite sides of said first transducer; second energy source means coupled in energy-transfer relation to said pair of transducers for establishing pressure fields to reduce to a reference value fluid flow longitudinally in the bore hole at two locations each intermediate said first energy transducer and a corresponding one of said pair of energy transducers; and means for providing indications of the fluid pressure at a location near said first energy transducer.

9. Apparatus for exploring earth formations traversed by a bore hole containing a liquid comprising: a first energy transducer adapted to be lowered into the bore hole; means for energizing said first transducer to establish a pressure field in the liquid of the bore hole; second and third velocity-sensitive energy transducers mounted in fixed relation to, and on opposite sides of, said first transducer for deriving respective control potentials representing fluid movement relative to said second and third transducers; fourth and fifth energy transducers each mounted in fixed relation to a corresponding one of said second and said third transducers on a side thereof opposite said first transducer; means responsive to said control potentials for energizing said fourth and said fifth transducers to establish pressure fields to reduce substantially to zero fluid movement longitudinally in the bore hole in the vicinity of said second and said third transducers; and means providing indications of fluid pressure at a location near one of said second and said third transducers.

10. Apparatus for exploring earth formations traversed by a bore hole containing a liquid comprising: a first energy transducer adapted to be lowered into the bore hole; a source of alternating current of predetermined frequency electrically coupled to said first transducer to establish a pressure field in the liquid of the borehole; second and third velocity-sensitive energy transducers mounted in fixed relation to, and on opposite sides of, said first transducer for deriving respective control potentials representing fluid movement relative to said second and said third transducers; fourth and fifth energy transducers each mounted in fixed relation to a corresponding one of said second and said third transducers on a side thereof opposite said first transducer; means responsive to said control potentials and coupled to said fourth and said fifth transducers for supplying thereto alternating current of said predetermined frequency and having a phase and amplitude to establish pressure fields to reduce substantially to zero fluid movement longitudinally in the bore hole in the vicinity of said second and said third transducers; and means providing indications of the fluid pressure at a location near one end of said second and said third transducers.

11. Apparatus according to claim 8 wherein each of said first transducer and said pair of transducers comprise a housing having an opening and a diaphragm closing said opening thereby to provide a volume which varies with changes in energy supplied by respective ones of said first and said second energy source means.

12. Apparatus according to claim 8 wherein said first transducer comprises a housing having an opening and a diaphragm closing said opening thereby to provide a volume which varies with changes in energy supplied by said first energy source means, and wherein said pair of transducers individually include a tube having open ends exposed to the liquid of the bore hole in spaced relation from one another in a direction parallel to the axis of the bore hole and a piston within said tube thereby to produce a differential pressure which varies with the energy supplied by said second energy source means.

13. Apparatus for exploring earth formations traversed by a bore hole containing a liquid comprising: a first energy transducer adapted to be lowered into the bore hole; first energy source means coupled in energy-transfer relation to said first transducer for establishing a pressure field in the liquid of the bore hole; a pair of longitudinally spaced apart energy transducers mounted in fixed relation to and on opposite sides of said first transducer; second energy source means coupled in energy transfer relation to said pair of transducers for establishing pressure fields to reduce to a reference value fluid flow longitudinally in the bore hole at two locations each intermediate said first energy transducer and a corresponding one of said pair of energy transducers; and means for providing indications of the relative phase between the pressure at a location near said first energy transducer and the energy supplied by one of said energy source means.

14. Apparatus for exploring earth formations traversed by a bore hole containing a liquid comprising: first, second and third transducers adapted to be lowered into the bore hole in fixed, longitudinally spaced relation and in the named order; means for creating a pressure field in the liquid of the bore hole at a first location near said second transducer; means for creating additional pressure fields in the liquid in the bore hole at each of second and third locations intermediate said first and said second transducer and said second and said third transducer, respectively, said additional pressure fields being adjustable and responsive to signals derived by said first and said third transducers; and means for providing indications of a signal representing any pressure field incident on said second transducer.

15. Apparatus according to claim 14 wherein said means for creating additional pressure fields include a differential pressure generator disposed at each of said second and said third locations and means for energizing said differential pressure generators.

16. Apparatus according to claim 14 wherein said means for creating additional pressure fields include a differential pressure generator disposed at each of said second and said third locations and means for energizing said differential pressure generators; and wherein said first and said third transducers are differential pressure detectors.

References Cited in the file of this patent
UNITED STATES PATENTS

| | | |
|---|---|---|
| 2,156,052 | Cooper | Apr. 25, 1939 |
| 2,350,371 | Smith | June 6, 1944 |
| 2,708,485 | Vogel | May 17, 1955 |
| 2,784,796 | Overton | Mar. 12, 1957 |